Aug. 15, 1944.  A. C. DURDIN, JR  2,355,713
FUEL SUPPLY MEANS FOR INTERNAL-COMBUSTION ENGINES
Filed June 24, 1940  5 Sheets-Sheet 1
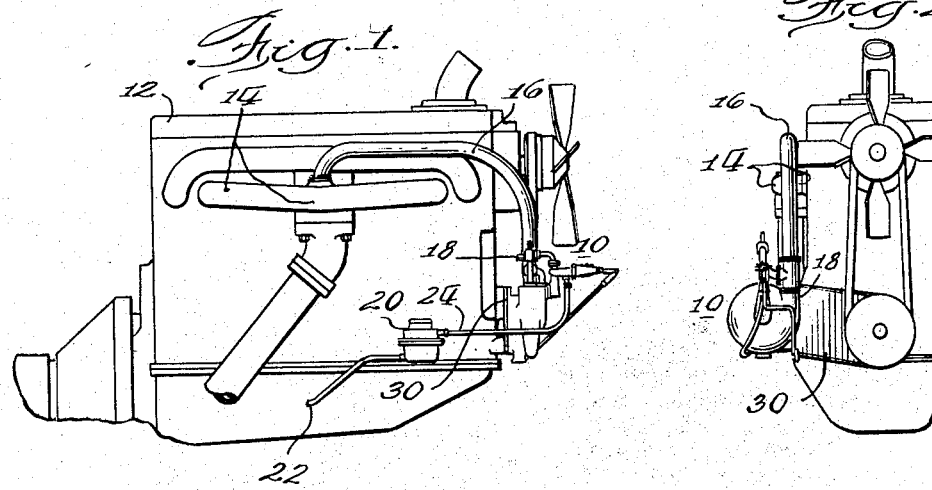
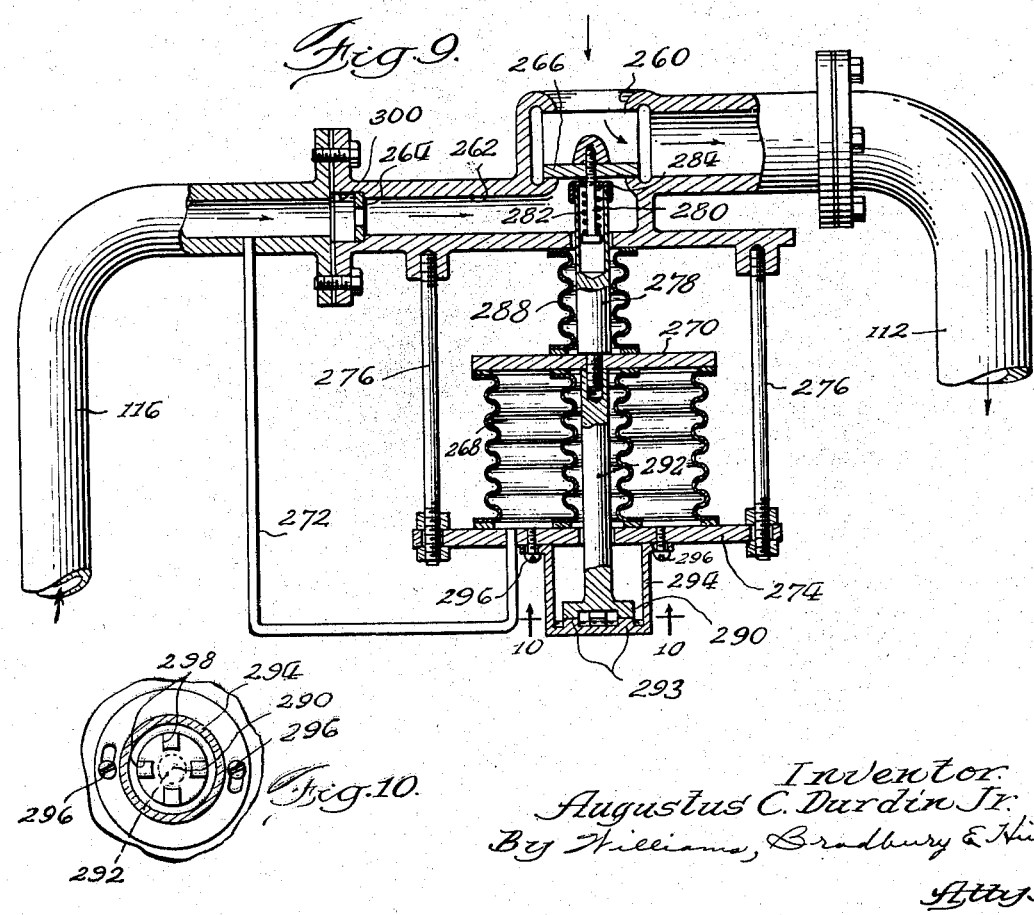

Aug. 15, 1944.  A. C. DURDIN, JR  2,355,713
FUEL SUPPLY MEANS FOR INTERNAL-COMBUSTION ENGINES
Filed June 24, 1940  5 Sheets-Sheet 2

Inventor
Augustus C. Durdin Jr.
By
Williams, Bradbury & Hinkle
Attys.

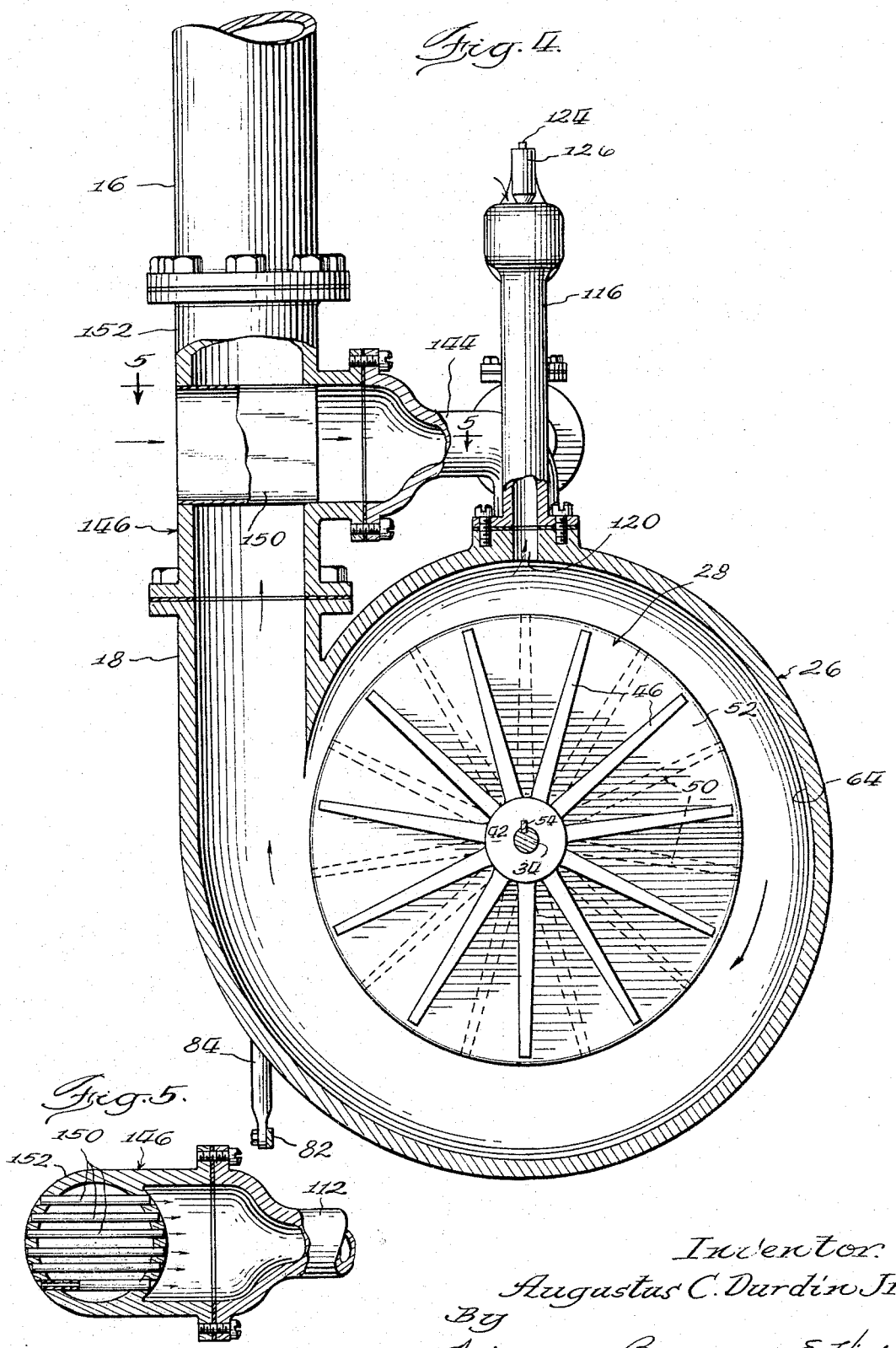

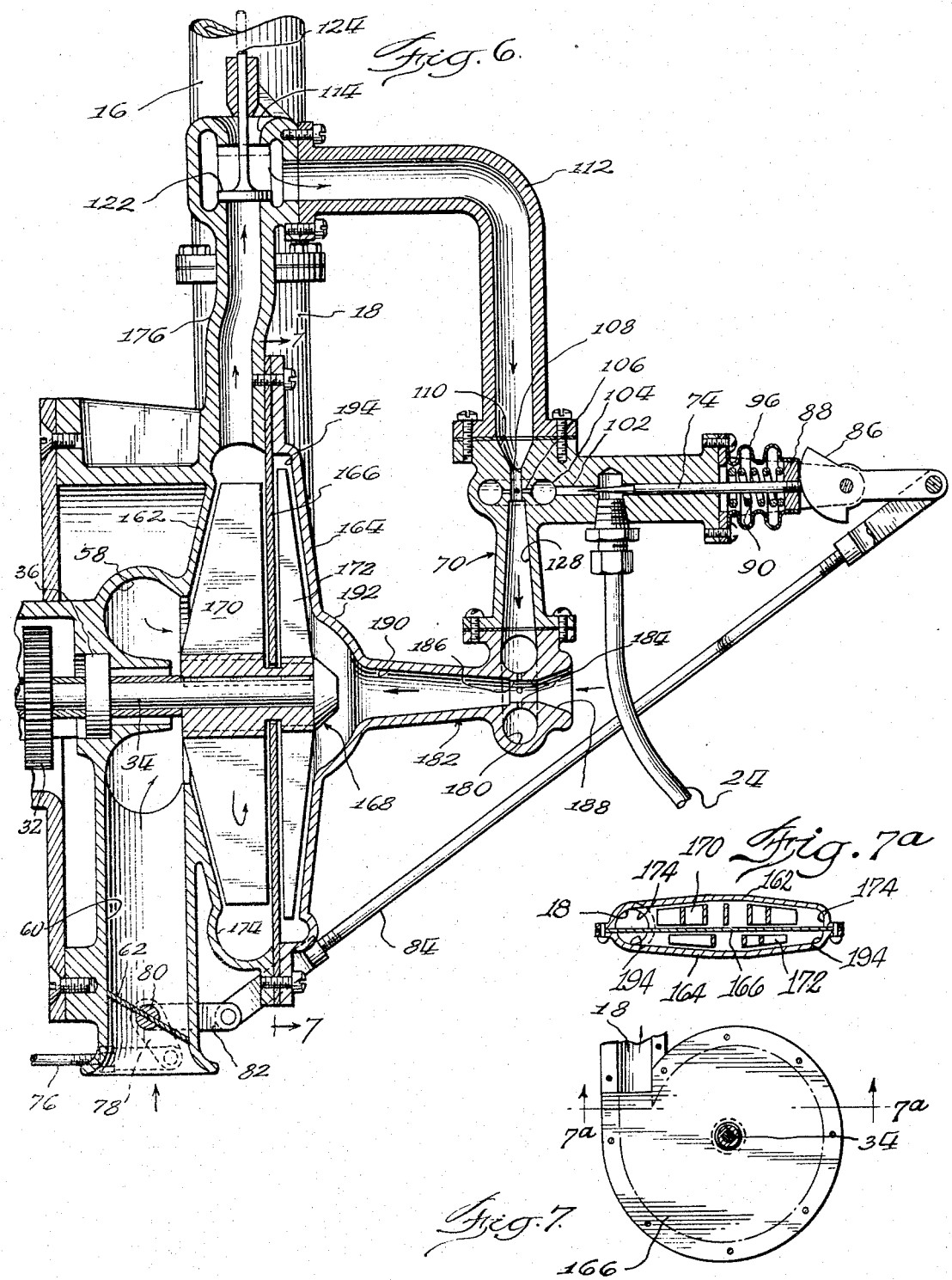

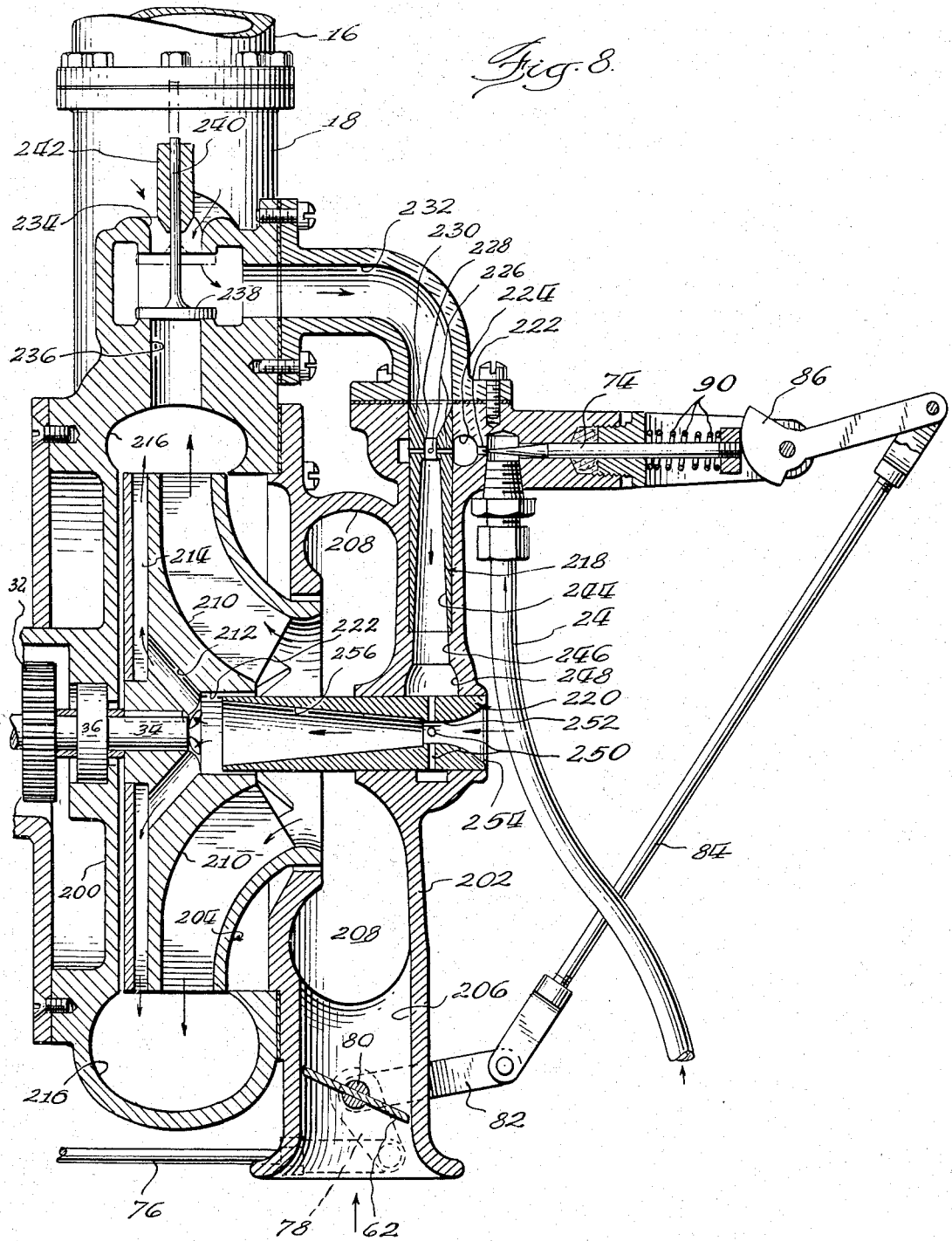

Patented Aug. 15, 1944

2,355,713

UNITED STATES PATENT OFFICE 2,355,713

FUEL SUPPLY MEANS FOR INTERNAL-COMBUSTION ENGINES

Augustus C. Durdin, Jr., Lincolnwood, Ill., assignor of twenty-four per cent to Augustus C. Durdin, III, Rockford, Ill., and twenty-four per cent to Lewis H. Durdin, Birmingham, Ala.

Application June 24, 1940, Serial No. 341,993

17 Claims. (Cl. 123—119)

The present invention relates to fuel supply means for internal combustion engines and has for its primary object the provision of a new and improved fuel supply means making practicable the use of inexpensive high flash point fuels in internal combustion engines of various types, and especially in airplane engines.

Fuels having a high flash point such, for instance, as 100° F., have not heretofore been practicable for operation of internal combustion engines because of the lack of satisfactory means for vaporizing them. Fuels of this nature have many advantages over highly volatile fuels making them highly desirable. For instance, they cannot be ignited by incendiary bullets, they do not burn if suddenly released over the wreckage of an airplane, and their cost is but a fraction of that of the highly volatile fuels now used.

Fuel injection devices, such as Venturi tubes, which are used in vaporizing the more volatile fuels, are not satisfactory because of the insufficient velocity of the air flow therethrough. The velocity of the air passing by the throat of a Venturi tube is dependent upon the difference in pressures existing at the inlet and outlet ends of the tube. If a Venturi tube be utilized in conjunction with either an engine intake manifold or with a supercharger, the difference in pressures is equal to the difference between the atmospheric pressure existing at the inlet end, the suction at the outlet end resulting from the connection of that end to the intake manifold or suction side of the compressor. If this difference in pressures is sufficient to produce the air velocity required to vaporize high flash point fuels, it results in a decrease in the power output of the engine or an extra burden upon the supercharger.

One of the objects of the present invention is the provision of a new and improved fuel supply system for internal combustion engines.

Another object of the present invention is the provision of a novel combined supercharger and carbureter, and one adapted particularly for high flash point fuels.

Another object of the invention resides in the utilization of a portion of the high pressure, high temperature discharge of a supercharger in the vaporization of fuel, and further, in utilizing air or a mixture of air and fuel discharged by the supercharger for this purpose.

Another and somewhat more specific object of the present invention is to provide a new and improved fuel supply system for internal combustion engines comprising a supercharger and means for supplying a mixture of air and fuel to the suction side of the supercharger wherein the high pressure, high temperature discharge from the supercharger is utilized to effect a more complete vaporization of the fuel.

A further more specific object of the invention resides in providing a system of the type last mentioned with fuel supply means comprising a pair of Venturi tubes connected in series, the outlet of one of which is connected to the suction side of the supercharger and the inlet of which is connected to atmosphere, and the outlet of the other of which is connected to the throat of the first and the inlet of which is connected to the discharge side of the supercharger, thereby to effect an adequate and thoroughly vaporized supply of the fuel for the engine.

A further object of the invention resides in the utilization of heat generated by and obtained from the supercharger for heating at least part of the air mixed with the fuel supplied to an internal combustion engine.

A further object of the present invention is to provide a fuel supply system for internal combustion engines with a control means whereby either atmospheric air or the high pressure, high temperature discharge from the supercharger is utilized in supplying fuel to the engines.

A further object of the invention is to provide control means for a system of the type last specified operating automatically in response to the pressure generated by the supercharger, and, furthermore, a control means which may be readily adjusted to operate at different pressures, so that when the engine is started or idling atmospheric air is utilized in effecting vaporization of the fuel, and the high pressure, high temperature discharge is utilized under power operation of the engine.

Another object of the present invention resides in providing a combined supercharger and carbureter wherein the supercharger comprises two portions, one for compressing air alone and the other for compressing a mixture of air and fuel, and wherein the supply of fuel for mixture with air and the supply of air to one portion of the compressor are controlled conjointly.

A further object of the present invention resides in the provision of new and improved superchargers.

Another object of the present invention resides in the provision of a novel method of supplying a mixture of air and fuel to an internal combustion engine through a centrifugal type supercharger, which includes the step of heating at least part of the air mixed with the fuel by heat generated by the supercharger and obtained from the discharge side thereof.

Another object of the present invention resides in the provision of a novel method of supplying fuel to an internal combustion engine through a centrifugal type supercharger and a fuel injection device connected to the suction side of the supercharger, which includes passing a portion of the high pressure, high temperature supercharger discharge through the device.

A still further object of the present invention resides in the provision of a novel method of supplying fuel to an internal combustion engine through a centrifugal type supercharger and a fuel injection device connected to the suction side of the supercharger, which includes passing atmospheric air through the device when the engine is idling and passing a portion of the high pressure, high temperature supercharger discharge through the device when the engine is operating at a predetermined speed above idling speed.

Further objects and advantages of the present invention will become apparent from the ensuing description, in the course of which reference is had to the accompanying drawings in which:

Fig. 1 is a side elevation illustrating the fuel supply means of the present invention attached to an internal combustion engine;

Fig. 2 is a front elevation of the apparatus shown in Fig. 1;

Fig. 4 is a vertical cross-sectional view of another embodiment of my invention;

Fig. 5 is a horizontal cross-sectional view through a heat exchanger forming part of the fuel supply means of the present invention, the view being taken along the line 5—5 of Fig. 4;

Fig. 6 is a view similar to Fig. 3 of another embodiment of the present invention;

Fig. 7 is a vertical cross-sectional view, on a reduced scale, taken along the line 7—7 of Fig. 6;

Fig. 7A is a fragmentary, horizontal, cross-sectional view taken along the line 7A—7A of Fig. 7;

Fig. 8 is a view similar to Figs. 3 and 6 of a further embodiment of the present invention;

Fig. 9 is a side elevation, partly in section, illustrating a form of control for automatically changing over from idling to power operation which may be utilized with any of the embodiments of the present invention but which is illustrated in less detail in Fig. 3; and Fig. 10 is a horizontal cross-sectional view taken along the line 10—10 of Fig. 9.

Figure 3:
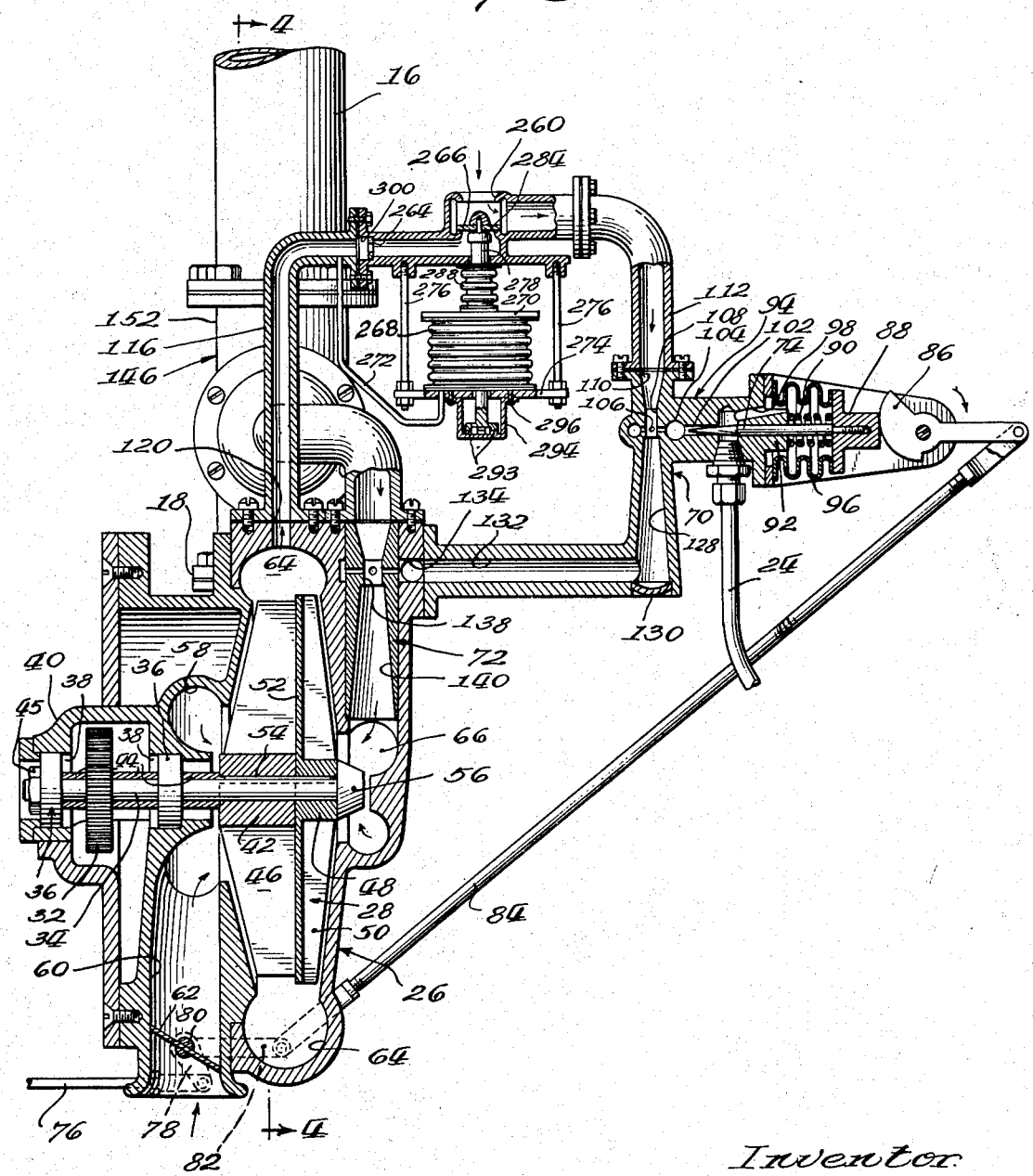
Fig. 3 is a vertical cross-sectional view through the fuel supply means of the present invention.

The fuel supply means of the present invention may be considered in one aspect as being a combined carbureter and supercharger which may be utilized with various types of internal combustion engines, but which is particularly designed for utilization in airplane engines operated with a high flash point fuel. In Figs. 1 and 2 the combined carbureter and supercharger, indicated generally by reference character 10, is shown attached to and forming part of an internal combustion engine illustrated diagrammatically and indicated by reference character 12. The engine is supplied with a mixture of compressed air and fuel through a conventional intake manifold 14 connected to a discharge conduit 16, connected, in turn, to the discharge outlet 18 of the carbureter and supercharger 10.

Fuel is supplied to the engine from a supply tank (not shown) by an engine-driven fuel pump 20 of the diaphragm type connected to the supply tank by a conduit 22. The discharge side of the pump is connected by a fuel feed line 24 to the combined carbureter and supercharger.

The combined carbureter and supercharger comprises a two-part casing, which may take the form of and which is illustrated as a pair of castings suitably secured together and to the engine, and an impeller 28 (see Figs. 3 and 4) of novel construction rotatably mounted within the casing. The casing and rotor constitute, as may be noted from the drawings and as will be described in greater detail hereinafter, a compressor of the centrifugal type.

The impeller 28 is driven at high speed by suitable gearing contained within an enclosure 30 and interconnecting the engine crankshaft (not shown) with a gear 32 fixedly secured to the impeller shaft 34, as illustrated in Fig. 3.

The impeller shaft is mounted for rotation in a pair of spaced-apart bearing races 36 suitably mounted in recesses 38, one of which is formed in one part of the casing 26 and the other in a bracket 40 formed integrally with that part of the casing. The bearing races and gear 32 are spaced from each other as well as from an impeller hub portion 42 by three sleeves 44, and these elements are secured in spaced-apart relationship by means of a nut 46 secured to the threaded end of the impeller shaft 34.

The compressor constituted by the casing 26 and the impeller 28 serves not only as a supercharger, but aids in the vaporization of the fuel supplied to the engine. The impeller is comprised of two portions, one constituted by the previously mentioned hub portion 42 and a plurality of radial vanes 46, and the other by a hub portion 48 and radial vanes 50. The two sets of vanes are separated from each other by a circular partition 52 formed integrally with the hub 48 and vanes 50. The two impeller portions are suitably affixed to the impeller shaft 34 as by means of a key 54, and the hub 48 terminates in a conical end 56 to provide a more efficient flow of fluid thereby.

The compressor portion, defined by hub 42 and vanes 46, is utilized to compress the supply of secondary air which is supplied thereto through an annular suction chamber 58 and an air inlet passage 60. The latter is provided with a valve 62 for a purpose and operated in accordance with a manner to be described more fully hereinafter. The compressed air is discharged into a discharge chamber 64.

The impeller portion constituted by the hub 48 and vanes 50 is utilized to compress a mixture of fuel and air supplied thereto through an annular suction chamber 66, and the compressed mixture is discharged into the discharge chamber 64.

The impeller is made in two portions, one for compressing air and the other for compressing air and fuel, in order to make the compression of air and fuel substantially independent of the compression of air alone. It is preferred, particularly with extremely high flash point fuels, that the impeller vanes 50 of the air and fuel compressing portion be made somewhat greater in diameter than the vanes 46 of the air compressing portion, in order to obtain a greater suction at the suction side of the air and fuel compressor.

As has already been indicated, the fuel supply means of the present invention is designed particularly for use with fuels having a high flash point. Fuels of this nature, in order to be utilizable, must be vaporized to a high degree. This vaporization may be effected mechanically, by the application of heat, or by use of a carbureting device such as a Venturi tube. According to the present invention, the Venturi tube and mechanical mixing are utilized to effect starting and idling operation of the engine, and high velocity, high temperature air or mixture of air and fuel is utilized in addition to these in order to secure a more complete vaporization and, therefore, more efficient operation of the engine at speeds above the idling speed.

Fuel is supplied to the combined carbureter and supercharger through the previously mentioned conduit 24 and preferably, but not necessarily, through a pair of series connected fuel injection Venturi tubes of the stepped type indicated generally by reference characters 70 and 72, the latter of which leads to the suction chamber 66. The tube 70 may be considered as a primary tube and the tube 72 as a secondary tube. The use of series connected Venturi tubes is particularly advantageous in the utilization of a high flash point fuel in that a more complete mixture of fuel and air as well as vaporization of the fuel is obtainable because of the higher velocity of the air or mixture of air and fuel flowing through the primary tube.

The supply of fuel and of secondary air are controlled, respectively, by a needle valve 74 and the previously mentioned valve 62 located in the air inlet passage 60. The positions of these valves are controlled jointly through a rod 76 extending to the operator's compartment of the vehicle driven by the engine. The rod 76 is connected by a crank arm 78 operable to rotate a shaft 80, upon which the valve 62 is mounted, and a crank arm 82 connected by a rod 84 to a cam 86 controlling the position of the needle valve 74.

The controlling mechanism, as well as the valves, are indicated in the positions they occupy when the engine is idling. At this time the valve 62 is closed and the needle valve 74 is opened to supply only a limited amount of fuel to the Venturi tubes. The needle valve is attached at its outer extremity to a cap-like member 88 maintained in engagement with the cam 86 by a spring 90 located therebetween and a circular boss 92 formed at the outer extremity of a structural member 94 which includes the Venturi tube 70 as an integral part thereof. A bellows 96 is utilized to prevent leakage of fuel from about the needle valve 74, and in order to permit efficient operation of the needle valve, the interior of the bellows is connected to the fluid conduit by means of a passage 98.

Fuel is supplied to the first Venturi tube 70 through a passage 102 connecting conduit 24 and an annular passage 104 from which a plurality of orifices 106 lead to the throat 108 of the Venturi tube.

One of the important features of the present invention resides in the utilization of a portion of the high pressure and high temperature air or fuel mixture from the discharge side of the supercharger during power operation of the engine to obtain a thorough vaporization of the fuel and in the utilization of atmospheric air when the engine is idling.

The conduit 112 is adapted selectively to be connected either to the atmosphere through an orifice 260 or to a conduit 262 communicating with conduit 116 through a flow restricting orifice member 264, dependent upon the position of a valve 266. The latter is shown in the position it occupies during idling, at which time conduit 112 is connected to the atmosphere through the orifice 260. The valve 266 is shifted to close orifice 260 and to place conduits 112 and 116 in communication at adjustable predetermined compressor discharge pressures. The valve is operated by a bellows 268 closed at its upper end by a movable plate 270 and connected at its lower end by a relatively small diameter conduit 272 to the conduit 116. The conduit 272 extends within the bellows through an aperture formed in a fixed base plate 274 adjustably mounted on a plurality of supports 276 of which only two are shown. The movable plate 270 is connected to the valve 266 by a lost motion connection including a stud 278 threaded through the plate 270 and hollowed at its upper end to receive a bolt 280 secured to the valve 266 and biased downwardly by a spring 282 (Fig. 9), held between the head of the bolt and a cap 284 closing the hollow end of the stud 278 (Fig. 9). A bellows type seal 288 serves to prevent leakage of fluid past the stud 278.

When the engine is idling, a pressure less than atmospheric pressure exists within the bellows 268 by reason of the domination of the suction in the intake manifold over the pressure generated by the compressor. Consequently, the bellows 268 tends to collapse to hold the valve 266 in the position indicated. When the pressure generated by the compressor increases, the bellows tends to expand and to move the valve operating stud 278 upwardly. The upward movement is prevented, until a predetermined pressure exists, by the surface tension existing between the under surface of an enlarged head portion 290 of a rod 292 secured to the plate 270, and the upper surface of a boss 293 formed at the bottom of a cup-shaped member 294 secured to the underside of the fixed plate 274. In order to improve the surface tension, a film of light oil may be placed on the engaging surfaces or a small quantity of oil may be placed in the cup-shaped member 294, as indicated in Fig. 9.

To provide an arrangement whereby the pressure at which the valve 266 is moved upwardly may be varied, the engaging surfaces may be so constructed and arranged that the contact area therebetween may be varied. A simple arrangement for doing this is illustrated more particularly in Fig. 10 from which it may be seen that the member 294 may be rotated a small amount upon loosening of a pair of screws 296 by means of which the member is secured to the plate 274. The contacting surfaces of members 290 and 294 are cut away, as indicated at 298, so that the contact area therebetween may be varied by rotating one member relative to the other.

The adjustment of the amount of flow of air or of air and fuel through the conduit 116 and through the Venturi tubes may be effected by utilizing orifice members 264 of different sizes. These orifice members are removably mounted in a recess 300 formed at the end of conduit 262 so that it is a relatively simple matter to substitute one orifice member for another.

When the engine is idling, the suction created in the intake manifold and by the compressor is effective to draw atmospheric air through the orifice 260, the conduit 112 and past the throat 108 of the tube 70. As a result of the suction created by the flow of air past the orifices 106 and of the pressure applied by the fuel pump to the fuel, vaporized fuel is supplied to the outlet end 128 of the Venturi tube 70, the outer end of which is closed by a cap 130. The outlet end of Venturi tube 70 is connected by a port 132 to an annular passage 134 opening through a plurality of orifices 136 to the throat 138 of the second Venturi tube 72 which tube may take, and is illustrated as taking, the form of a separate structural element inserted in a recess formed in one of the sections of the compressor casing 26. The outlet end 140 of the Venturi tube 72 communicates with the suction chamber 66 of the compressor, while the inlet end 142 thereof is connected to the atmosphere through an elbow conduit 144 and a heat exchanger indicated as a whole by reference character 146. When the engine is idling, the suction created by the compressor and in the intake manifold is effective also to draw in atmospheric air through the Venturi tube 72. The air which flows past the throat 138 of the Venturi tube 72 is effective to draw in the mixture of air and fuel from the first Venturi tube 70 and further vaporize the fuel so that a mixture of substantially completely vaporized fuel and air is supplied to the suction chamber 66 and, thus, to the intake manifold through the supercharger and conduit 16.

The Venturi tubes are so designed that the fuel supplied to the intake manifold is vaporized sufficiently to at least enable the engine to start and idle. At this time the vaporization of the fuel is effected by the two Venturi tubes and by the mechanical action of one portion of the compressor, that is, the portion comprising the vanes 58. Under idling conditions the engine does not rotate at a very high speed, and consequently the mixture of air and fuel is not compressed to an appreciable extent. The temperature of the mixture, therefore, is not particularly high and the heat exchanger 146 does not appreciably raise the temperature of the atmospheric air. However, under power operation of the engine, the temperature of the atmospheric air is raised to an appreciable extent to increase the vaporization of the fuel. The vaporization is also increased by the connection of the inlet end of the first Venturi tube 70 to the compressor discharge chamber 64 through conduits 112 and 116. It may be seen, therefore, that vaporization of the fuel is assisted by the heat of compression and power losses in the supercharger.

The heat exchanger 146, illustrated best in Figs. 4 and 5, comprises a number of flattened tubes 150 secured to and extending through a conduit 152 interconnecting conduit 16 and the compressor outlet port 18. The air passing through the several tubes 150 is heated by the compressed mixture of fuel and air flowing around the tubes through the conduit 152 to the intake manifold.

Under power operation of the vehicle, the supercharger is driven at a considerably higher rate of speed, with the result that the pressure existing in the discharge chamber rises to a predetermined value, dependent upon the characteristics of the engine and fuel, sufficient to open the valve 266 through the influence of bellows 288 into which the pressure is now conducted through conduit 272. When the valve moves upwardly, it is effective to close orifice 260, to cut off the supply of atmospheric air to the first Venturi tube, and to substitute the high pressure, high temperature mixture of air and fuel obtained from the discharge chamber 64 in place thereof, with the result that the vaporization of the fuel is increased by reason of the higher velocity and temperature of the mixture with which it is mixed in the Venturi tubes and supercharger.

In operation, the impeller of the compressor is rotated at a speed proportional to that of the engine. When the engine is idling, it is supplied with a limited amount of fuel by the fuel pump and the combined carbureter and supercharger of the present invention. At this time the air inlet butterfly valve 62 is closed and the needle valve 74 is open only a limited extent. The change-over valve 266 is at its lowermost position so that the orifice 260 is open and the conduit 116 leading to the discharge chamber is closed. Fuel is supplied to the intake manifold as a result of the suction in the intake manifold and that created by the slow speed operation of the compressor and the resultant flow of atmospheric air through both the Venturi tubes. The air drawn through the first of the Venturi tubes partially vaporizes the fuel, and the air drawn through the second Venturi tube 72 is effective further to vaporize the fuel. The fuel is further vaporized by the supercharger and then flows to the intake manifold. The Venturi tubes are so designed that at this time the fuel is vaporized sufficiently to permit the starting and idling of the engine even though the fuel be of a type having a high flash point.

The anterior throttle valve 62 of the supercharger and needle valve 74 are mechanically interconnected and the needle valve is so shaped that the proper amount of fuel will be delivered to the intake manifold of the engine when the engine is operated at speeds above the idling speed. Upon the operation of the control mechanism to supply an added amount of fuel to the engine, the supercharger inlet valve and the fuel valve 74 are both opened, and as the pressure in the compressor discharge chamber 64 increases above a predetermined value, the valve 266 is moved upwardly to open conduit 116 and close orifice 260. A small portion of the high temperature, high pressure mixture of air and fuel in the discharge chamber 64 is thus caused to flow through the first Venturi tube 70 more effectively to vaporize the fuel supplied to the second Venturi tube 72. The atmospheric air flowing through the second Venturi tube, which is at this time heated by the mixture of air and fuel flowing from the supercharger to the intake manifold, is also more effective in vaporization of the fuel flowing to the supercharger. The increased speed of rotation of the impeller also results in an increased mechanical action upon the mixture of fuel and air so that the fuel supply means as a whole is effective substantially completely to vaporize even a very high flash point fuel, the use of which is highly desirable in airplanes because it cannot be ignited by incendiary bullets and does not burn if spread over the wreakage of a crashed airplane and which may be obtained at a fraction of the cost of fuels now commonly utilized in airplanes.

The utilization of the heat of compression and power losses of the supercharger for preheating the air mixed with the fuel, both by the use of the heat exchanger and by the use of air by-passed from the discharge side through the Venturi tubes to the suction side, results in a more efficient fuel supply system because heat from the discharge side is utilized in the vaporization of the fuel. If an external source of heat were utilized to vaporize the fuel, then the heat thus applied would be effective to increase the temperature of the mixture supplied to the intake manifold above the temperature to which it is raised by the supercharger alone, and thereby decrease the weight of the charge supplied to each engine cylinder. According to the instant invention and as pointed out above, an increased vaporization is obtained without any increase in the temperature of the mixture supplied to the intake manifold of the engine.

While the embodiment of the invention described above comprises a pair of Venturi tubes connected in series, it should be understood that only a single venturi may be utilized, as well as a greater number than two, the number depending on the nature of the fuel. If the fuel is of a highly volatile type, then only a single Venturi tube need be used, in which event it would be preferable to connect the outlet end of Venturi tube 70 directly to the suction side of the compressor.

In the practice of the present invention it is not necessary to utilize a heat exchanger or to utilize a supercharger constructed in accordance with the details outlined above. For instance, the impeller may be made in two sections separated by a fixed plate, and compressed air alone, instead of a mixture of gas and air, may be utilized during power operation of the engine to provide a more complete vaporization and atomization of the fuel. A construction of this nature has been illustrated in Figs. 6 and 7 wherein parts like those of the previously described embodiment are indicated by like reference characters.

The compressor of this embodiment comprises a casing made of two castings 162 and 164, separated by a fixed plate 166 having a shape such as that illustrated more particularly in Fig. 7. The impeller shaft 34 has mounted thereon a hub 168 to which is secured a plurality of radial vanes 170 rotatable in the space defined by casting 162 and plate 166, and a plurality of vanes 172, of a diameter greater than vanes 170, rotatable in the space defined by the casting 164 and plate 166. The air inlet passage 60 leads to the annular suction chamber 58 and the compressed air flows into an air discharge chamber 174, and the latter is open to the compressor outlet port 18 connected to the conduit 16 leading to the intake manifold 14. The air discharge chamber 174 communicates with a conduit 176 which is closed by the valve 122 when the engine idles. The valve 122 is weighted and is operable to open the conduit and close the orifice 114 when the pressure generated by the compressor is above a predetermined value. A conduit 112 connects either the orifice or the conduit 176 to the first Venturi tube 70 which is substantially the same in construction as the first Venturi tube of the previously described embodiment. In the instant embodiment, the outlet end 128 of the first Venturi tube 70 communicates with an annular chamber 180 forming part of a second Venturi tube, indicated generally by reference character 182 and formed as an integral part of the compressor casting 164. A plurality of orifices 184 lead from the annular chamber 180 to the throat 186 of the Venturi tube. The inlet end 188 of the Venturi tube is open to the atmosphere and the outlet end 190 thereof opens into a cup-shaped portion 192 of the compressor casting which forms, in substance, a suction chamber for the air and fuel compressor portion of the supercharger. This compressor discharges into a discharge chamber 194 which, like the air discharge chamber 174, is open to the outlet port 18, as best illustrated in Fig. 7A.

The operation of the embodiment of Figs. 6 and 7 is substantially the same as that of the previously described embodiment, except that the air supplied to the second Venturi tube 182 is not heated and in that air alone passes through the conduit 112 both during idling and power operation of the engine. Air alone is compressed by one compressor section and a mixture of fuel and air by the other, and the compressed air and compressed mixture are thoroughly mixed together in the discharge conduit 18 prior to being supplied to the intake manifold of the engine. Inasmuch as air alone is supplied to the first Venturi tube, vaporization of fuel by the latter is increased.

The embodiment of Fig. 8 is similar to that of Figs. 6 and 7 in so far as mode of operation is concerned, differing therefrom primarily in structural details. The compressor of this embodiment comprises a pair of castings 200 and 202 within which is mounted an impeller, indicated generally by reference character 204. The impeller is fixedly secured to the impeller shaft 34. Air is supplied to the compressor through an inlet conduit 206 formed integrally with the casting 202 and opening into an annular suction chamber 208. The suction chamber communicates with a plurality of axially and radially extending passages 210 formed within the impeller and constituting the air compressing portion of the compressor. The impeller is also provided with a plurality of axially and radially extending passages 212 communicating with radially extending passages 214 which together constitute the fuel and air mixture compressing portion of the impeller. The passages 210 and 214 open into the compressor discharge chamber 216 at the same distance from the axis of rotation, and the chamber, in turn, communicates with the compressor outlet port 18.

Fuel is supplied to the supercharger through a pair of series connected fuel injection Venturi tubes 218 and 220, the latter of which extends into an axial circular recess 222 in the impeller with which the impeller passageways 212 communicate. As in the previously described embodiment, fuel is supplied to the combined carbureter and supercharger through the fuel feed line 24 under the control of a needle valve 74 controlling the effective size of an orifice 222 leading from the fuel line to an annular chamber 224 connected, in turn, by a plurality of orifices 226 to the throat 228 of the Venturi tube 218. The Venturi tube 218 is preferably formed as a sleeve adapted to be inserted into a recess formed in the compressor casing casting 202. The needle valve 74 is also slidably mounted in a boss formed as an integral part of the same casting. When the engine is idling, the inlet end 230 of the first Venturi tube 218 is connected to the atmosphere through an elbow conduit 232 and an orifice 234 formed at the upper end of the other compressor casing casting 200. When the engine is driven at higher speeds and the pressure generated by the compressor rises above a predetermined value, the inlet end 230 of the Venturi tube 218 is connected to the compressor discharge chamber 216 through a port 236, the valve 238 being moved upwardly to close the orifice and open the port by the pressure generated by the compressor. The valve 238 is provided with a stem 240 slidably mounted in a guiding member 242 formed at the upper end of the casting 200.

The air and fuel flowing past the throat of the first Venturi tube flows to the second Venturi tube 220 through the outlet end 244 of the first Venturi tube, a port 246, an annular chamber 248, and a plurality of orifices 250 leading from the annular chamber to the throat 252 of the second Venturi tube. The inlet end 254 of the second Venturi tube is open to atmosphere and the outlet end 256 thereof leads to the recess 222 in the impeller.

The fuel valve 74 and air inlet valve 62 are connected for conjoint control by the operator by mechanism substantially the same as that previously described and indicated by the same reference characters.

The last described embodiment of the present invention is similar in some respects to the two first described embodiments. It is similar to the first in that a mixture of air and gas is utilized during power operation of the vehicle to effect vaporization of the fuel, and similar to the second described embodiment in that the air supplied to the second Venturi tube is not preheated. One advantage of the last described embodiment results from the fact that the closed passage impeller does not require the accurate clearance therebetween and the compressor casing required by the previously described embodiments.

In the adaptation of the fuel supply means described above to various types of airplanes or for use of different types of fuels, it may be desirable to vary the flow of air or the mixture of air and fuel from the discharge chamber of the compressor through the Venturi tubes, or it may be desirable to change the pressure at which the change-over valve is operated to supply the high temperature compressed air or mixture of gas and air to the Venturi tubes. The type of valve operating mechanism shown in either Fig. 3 or Fig. 6 may be used.

From the foregoing description of several embodiments of the present invention, it may be noted that the invention is susceptible of considerable modification by those skilled in the art. For instance, many of the desirable results of the invention may be realized with fuel injection devices other than Venturi tubes. It should be understood, therefore, that the described embodiments are intended merely to be illustrative and not limitative of the invention.

What I claim is new and desire to secure by United States Letters Patent is:

1. In apparatus of the class described, the combination including, a supercharger comprising a pair of compressors each having a discharge chamber opening into a common discharge conduit, one for compressing air and the second for compressing a mixture of fuel and air for supplying fuel to an engine, means for supplying air to the first of said compressors, means including a liquid fuel injection Venturi tube for supplying a mixture of air and fuel to the second of said compressors, and conduit means conducting fluid under pressure greater than atmosphere from the discharge chamber of the first compressor to the inlet end of said Venturi tube.

2. In a fuel supply system for an internal combustion engine, the combination including, a liquid fuel injection Venturi tube having inlet and outlet ends, a centrifugal compressor having a suction chamber communicating with the outlet end of said tube, a second suction chamber communicating with the atmosphere and separate impeller elements and discharge chambers associated with said suction chambers to define air and fuel compressors, conduit means connecting said discharge chambers to the engine, and conduit means connecting the air discharge chamber to the inlet end of said Venturi tube for supplying all of the fluid to the inlet end of said Venturi tube, when the compressor delivery pressure is high.

3. In a fuel supply system for internal combustion engines, the combination including, a supercharger for supporting fuel under pressure to the engine, means including a fuel injection Venturi tube having an outlet end continuously communicating with the suction side of said supercharger for supplying fuel to the latter, and means including a device responsive to the pressure generated by said supercharger for selectively connecting the inlet end of said tube to atmosphere or to the discharge side of said supercharger.

4. In a fuel supply system for internal combustion engines, the combination including, a supercharger for supplying fuel under pressure to the intake manifold of the engine, means including a fuel injection Venturi tube having an outlet end communicating with the suction side of the supercharger for supplying fuel to the latter, conduit means adapted to connect the inlet end of said tube to atmosphere, conduit means adapted to connect the inlet end of said tube to the discharge side of said supercharger, a two position valve normally opening said first conduit means and closing the second conduit means, and means operable in response to the pressure generated by the supercharger for operating said valve, said last mentioned means including a bellows connected by a conduit of restricted cross-sectional area to the discharge side of said supercharger, and a pair of surfaces in close contact with each other for preventing the bellows from operating the valve until the pressure generated by the supercharger exceeds a predetermined value above atmospheric pressure.

5. A system as claimed in the preceding claim, wherein the surfaces are rotatable with respect to each other to vary the contact area therebetween, thereby to vary the pressure at which the valve is operated.

6. In apparatus of the class described, the combination including, a supercharger for supplying fuel under pressure to an engine, and means for supplying fuel to the supercharger, said last mentioned means including a pair of fuel injection Venturi tubes connected in series, means for supplying fuel to the throat of the first of said tubes, the inlet end of the first of said tubes being in communication with the high pressure side of said supercharger, the inlet end of the second of said tubes being in communication with the atmosphere, the outlet end of the second tube being in communication with the suction side of the supercharger, and means for heating the atmospheric air flowing to the inlet of the second tube by heat derived from the discharge side of the supercharger.

7. In apparatus of the class described, the combination including, a supercharger for supplying fuel under pressure to an engine, said supercharger including an air inlet conduit and a fuel inlet, means for supplying fuel to said fuel inlet, said means including a pair of fuel injection Venturi tubes connected in series, a variable position valve for controlling the flow of fuel to the throat of the first of said Venturi tubes, said valve having an idling position in which only a limited amount of fuel is supplied to said Venturi tube, conduit means for connecting the inlet end of the first of said Venturi tubes to atmosphere, conduit means for connecting the inlet end of the first of said Venturi tubes to the high pressure side of said supercharger, valve means for normally opening the first of said conduit means and normally closing the second of said conduit means, the inlet end of the second of said Venturi tubes being connected to atmosphere and the outlet end thereof being connected to said fuel inlet, a valve in said air inlet conduit for controlling the flow of air therethrough, said valve having an idling position wherein the flow of air through said conduit is substantially cut off, means for simultaneously opening both of said valves for power operation of the engine, and means for operating said valve means to open said normally closed conduit means and to close said normally open conduit means when the pressure in the high pressure side of the supercharger rises above a predetermined value in the power operation of the engine.

8. In apparatus of the class described, the combination including, a supercharger comprising a pair of compressors, one for compressing air and the second for compressing a mixture of air and fuel, and both discharging into a common discharge chamber for supplying fuel to an engine, means for supplying air to the suction side of the first of said compressors, and means for supplying a mixture of air and fuel to the suction side of the second of said compressors, said last mentioned means including a pair of fuel injection Venturi tubes connected in series, means for supplying liquid fuel to the throat of the first of said Venturi tubes, conduit means for connecting the inlet end of the first Venturi tube to said discharge chamber, conduit means for connecting the inlet end of the second Venturi tube to atmosphere at atmospheric pressure, and means connecting the outlet end of the second Venturi tube with the second of said suction chambers.

9. In apparatus of the class described, the combination including, a supercharger comprising a pair of compressors, one for compressing air and the second for compressing a mixture of air and fuel, and both discharging into a common discharge chamber for supplying fuel to an engine, means for supplying air to the suction side of the first of said compressors, means for supplying a mixture of air and fuel to the suction side of the second of said compressors, said last mentioned means including a pair of fuel injection Venturi tubes connected in series, means for supplying liquid fuel to the throat of the first of said Venturi tubes, conduit means for connecting the inlet end of the first Venturi tube to said discharge chamber, conduit means for connecting the inlet end of said first Venturi tube to atmosphere, valve means normally closing the first of said conduit means and opening the second and operable in response to the pressure in the discharge chamber for opening the first and closing the second conduit means, means connecting the inlet end of the second Venturi tube to atmosphere at atmospheric pressure, and means connecting the outlet end of the second Venturi tube to the second of said suction chambers.

10. In apparatus of the class described, the combination including, a supercharger comprising a pair of compressors, one for compressing air and the second for compressing a mixture of air and fuel, and both discharging into a common discharge chamber for supplying fuel to an engine, means including a suction chamber and an air inlet conduit for supplying air to the suction side of the first of said compressors, means for supplying a mixture of air and fuel to the suction side of the second of said compressors, said last mentioned means including a pair of fuel injection Venturi tubes connected in series, means connecting the outlet end of the second Venturi tube to the second of said suction chambers, means connecting the inlet end of the second Venturi tube to atmosphere, conduit means for connecting the inlet end of the first Venturi tube to said discharge chamber, conduit means for connecting the inlet end of said first Venturi tube to atmosphere, valve means normally closing the first and opening the second of said conduit means and operable in response to the pressure in the discharge chamber for opening the first and closing the second, a valve that is closed when the engine is operating at idling speed for controlling the supply of air flowing through the air inlet conduit, a variable position valve for controlling the supply of fuel to the throat of the first of said Venturi tubes, said valve admitting but a limited supply of fuel to said Venturi tube when the engine is idling, and control means operable simultaneously to open both of said valves.

11. A combined carbureter and supercharger for use with internal combustion engines, including in combination, a compressor casing comprising two parts, each of which has formed integrally therewith a substantially annular suction chamber, an impeller mounted within said casing for rotation about an axis co-axial with respect to the suction chambers, said impeller comprising two portions each adapted to compress the material supplied to the suction chamber associated therewith, said casing including a single chamber into which both portions of the impeller discharge, one of said casing parts being formed with a radial recess opening into the suction chamber in said casing part, a fuel injection Venturi tube mounted in said recess, a second fuel injection Venturi tube comprising a separate structural element secured to said casing and connected in series with the first mentioned Venturi tube, and conduit defining means for connecting the inlet end of the second Venturi tube to the discharge chamber of the compressor.

12. A combined carbureter and supercharger for use with internal combustion engines, including in combination, a compressor casing comprising two parts, each of which has formed integrally therewith an annular suction chamber, an impeller mounted within said casing for rotation about an axis co-axial with respect to the suction chambers, said impeller comprising two compressor portions separated by a circular plate, said casing including a single chamber into which both portions of the impeller discharge, one of said casing parts being formed with an air inlet opening into the suction chamber formed in said casing part, the other of said casing parts being formed with a radial recess opening into the suction chamber in said casing part, a fuel injection Venturi tube mounted in said recess, a second fuel injection Venturi tube comprising a separate structural element secured to said casing and connected in series with the first mentioned Venturi tube, a conduit in communication with the discharge chamber of the compressor and having an orifice open to the atmosphere, a valve biased to close said conduit and to open said orifice and operable to open said conduit and close said orifice when the pressure generated by the compressor reaches a predetermined value, and a conduit connecting the inlet end of the second Venturi tube to said last mentioned conduit in such manner that it is normally in communication with the atmosphere through said orifice.

13. A combined carbureter and supercharger for use with internal combustion engines, including in combination, a compressor casing comprising two parts, each of which has formed integrally therewith a suction chamber and a discharge chamber, a two-part impeller rotatably mounted within said casing, a partition between the two parts of the casing and the two portions of said impeller, a common outlet port for both discharge chambers, a fuel injection Venturi tube formed integrally with one part of said casing, said tube having its outlet end opening into the suction chamber formed in said casing part, a second fuel injection Venturi tube comprising a separate structural element discharging into the constricted part of the Venturi tube forming a portion of said one of the casing parts, and conduit means forming connecting the inlet end of the second Venturi tube to the air discharge chamber of the compressor.

14. A combined carbureter and supercharger for use with internal combustion engines, including in combination, a compressor casing comprising two parts each of which has formed integrally therewith a suction chamber and a discharge chamber, a two-part impeller rotatably mounted within said casing, a partition between the two parts of the casing and the two portions of said impeller, a common outlet port for both discharge chambers, an air inlet conduit formed integrally with one of said casing parts and communicating with the suction chamber formed in said part, a fuel injection Venturi tube formed integrally with the other casing part, said tube having its outlet end opening into the suction chamber formed in said casing part, a second fuel injection Venturi tube comprising a separate structural element secured to the Venturi tube defining portion of said other casing part, a conduit leading from the air discharge chamber and formed integrally with said one casing part, said conduit terminating in an orifice open to the atmosphere, a valve normally closing said conduit and operable when the pressure in the air discharge chamber reaches a predetermined value for opening said conduit and closing said orifice, a conduit connecting the inlet end of the second Venturi tube to the conduit leading from the air discharge chamber in such manner that when the valve is in its normal position said conduit is connected to atmosphere through said orifice, and when said valve is operated to close the orifice, it is connected to the conduit normally closed by the valve.

15. A supercharger for use with internal combustion engines, including in combination, a two-part casing, one of said casing parts being provided with a central recess and an annular discharge chamber the other of said casing parts being provided with an annular suction chamber and an air inlet leading thereto, an impeller rotatably mounted between said casing parts, said impeller having an axial recess and a plurality of passages leading therefrom to the outer periphery of the impeller, a fuel injection Venturi tube having its outlet end extending into said recess and supported by the other of said casing parts, said impeller also having a plurality of axially and radially extending passages, the axial ends of which open into said suction chamber and the outer ends of which open into said discharge chamber, a radial recess formed in the other of said casing parts, the axial end of said recess being in communication with the throat of said first Venturi tube, a second fuel injection Venturi tube mounted in said recess with its outlet end located nearest the axis, a valve chamber having an orifice open to atmosphere at its upper end formed in said one of the casing parts, a port connecting said chamber to said annular discharge chamber, a valve mounted in said valve chamber normally closing the port and operable to open the latter and close said orifice when the pressure in the discharge chamber reaches a predetermined value, and conduit means for connecting said valve chamber to the inlet end of the second of said Venturi tubes.

16. In combination with an engine intake, a combined carbureter and supercharger structure, a casing of said structure having a divided impeller therein and having two high and two low pressure chambers externally and internally respectively of respective divisions of said impeller, one internal chamber and its associated external chamber conducting air only to said engine intake, the other internal chamber and its associated external chamber conducting a mixture of fuel and air to said engine intake, a conduit in series with both said impeller divisions extending from the external air conducting chamber of said casing to the internal mixture conducting chamber of said casing, and means for supplying liquid fuel to said conduit.

17. In apparatus of the class described, the combination including, a supercharger comprising a pair of compressors, one for compressing air and the second for compressing a mixture of air and fuel, and both discharging into a common discharge chamber for supplying fuel to an engine, means for supplying air to the suction side of the first of said compressors, and means for supplying a mixture of air and fuel to the suction side of the second of said compressors, said last mentioned means including a pair of fuel injection Venturi tubes connected in series, means for supplying liquid fuel to the throat of the first of said Venturi tubes, conduit means for connecting the inlet end of the first Venturi tube to said discharge chamber, conduit means for connecting the inlet end of the second Venturi tube to atmosphere through a heat exchanger located in the path of the discharge from the supercharger, and means connecting the outlet end of the second Venturi tube with the second of said suction chambers.

AUGUSTUS C. DURDIN, Jr.